United States Patent [19]

Sato

[11] Patent Number: 5,754,350
[45] Date of Patent: May 19, 1998

[54] LENS SUPPORTING DEVICE

[75] Inventor: Norio Sato, Tokyo, Japan

[73] Assignee: Asahi Kogaku Kogyo Kabushiki Kaisha, Tokyo, Japan

[21] Appl. No.: 694,527

[22] Filed: Aug. 9, 1996

[30] Foreign Application Priority Data

Aug. 10, 1995 [JP] Japan ................... 7-204875

[51] Int. Cl.$^6$ .................................. G02B 7/02
[52] U.S. Cl. .................. 354/818; 359/819; 359/808; 396/529
[58] Field of Search ................. 359/822, 827, 359/894, 704, 819, 820, 818, 808; 396/529

[56] References Cited

U.S. PATENT DOCUMENTS

| | | |
|---|---|---|
| 4,737,017 | 4/1988 | Nagasaka . |
| 4,778,252 | 10/1988 | Filho . |
| 4,850,674 | 7/1989 | Hasselskog .............. 359/820 |
| 4,893,143 | 1/1990 | Sheng-Huei ............. 359/827 |
| 5,052,782 | 10/1991 | Myer ...................... 359/827 |
| 5,210,658 | 5/1993 | Foster ..................... 359/894 |
| 5,249,082 | 9/1993 | Newman .................. 359/819 |
| 5,299,067 | 3/1994 | Kutz et al. ............... 359/827 |
| 5,446,593 | 8/1995 | Hamasaki et al. ........ 359/704 |
| 5,461,444 | 10/1995 | Okura et al. ............. 396/529 |
| 5,510,936 | 4/1996 | Aoki et al. ............... 359/822 |
| 5,537,262 | 7/1996 | Aoki et al. ............... 359/822 |

FOREIGN PATENT DOCUMENTS

| | | |
|---|---|---|
| 6146494 | 12/1986 | Japan . |
| 1429191 | 3/1976 | United Kingdom . |
| 1528084 | 10/1978 | United Kingdom . |
| 2161613 | 1/1986 | United Kingdom . |

*Primary Examiner*—Loha Ben
*Attorney, Agent, or Firm*—Greenblum & Bernstein P.L.C.

[57] ABSTRACT

A lens supporting device supports a lens to a lens frame. The lens supporting device includes an engaging groove, formed on a peripheral rim of the lens, and a plurality of engaging pawls formed on the lens frame. The engaging pawls engage with the engaging groove to secure the lens to the lens frame.

12 Claims, 4 Drawing Sheets

LENS SUPPORTING DEVICE

BACKGROUND OF THE INVENTION

1. Field of the Invention

The present invention relates to a device for supporting a lens. In particular, the present invention relates to a device in which a lens is supported by a lens frame.

2. Description of the Related Art

In general there are several methods available for supporting a lens by a lens frame. Such methods include mounting the lens to the lens frame via a presser ring, a method in which the lens is firstly inserted in the lens frame and then a part of the lens frame is bent so that the lens may be supported, i.e., caulking, or a method of fixing the lens to the lens frame by an adhesive or the like.

However, such methods of supporting as described above have several problems. For example, if a presser ring is used, screws or a method of snap-fitting may also be necessary. If the lens to be supported is a cemented lens consisting of a plural number of cemented lenses, the diameter of the lens frame or the presser ring also tends to increase. The caulking method of support is time consuming. Further, if an adhesive or the like is used to support the lens, a possibility exists that the lens may be damaged due to the adhesive running onto the lens.

Recently, since compact cameras have become desirable, the need has arisen for a space efficient lens supporting structure in which the size of the camera can be minimized.

SUMMARY OF THE INVENTION

It is an object of the present invention to provide a lens supporting device having a simple structure, and which is designed to be capable of saving further space.

To achieve the object mentioned above, according to an aspect of the present invention, a lens supporting device is provided in which a lens is supported by a lens frame. The lens supporting device includes an engaging groove, formed on a peripheral rim of the lens, and a plurality of engaging pawls formed on the lens frame. The engaging pawls engage with the engaging groove to secure the lens to the lens frame.

With the above-mentioned arrangement, the lens is simply supported by the lens frame by merely inserting the lens in the lens frame. Further, it is not necessary for each of the engaging pawls to be elongated to the peripheral rim of the lens. Accordingly, the lens is supported without an elongation of the engaging pawls, therefore it is possible to minimize the size of the lens frame.

Preferably, the lens is a cemented lens consisting of a plurality of lenses cemented together. The engaging groove is an annular groove formed along an outer peripheral rim of a cemented surface of the plurality of lenses. A cross-section of the engaging groove is preferably approximately V-shaped.

The plurality of engaging pawls are preferably formed along a circumferential direction of the lens frame.

In another aspect of the present invention, a lens supporting device is provided having an engagement supporting member formed on a lens frame, and at least a first lens and a second lens cemented together to form one cemented lens. The cemented lens is supported by the lens frame. One of either the first lens or the second lens is engaged with the engaging supporting member, and is also supported by the engaging supporting member. The first or second lens which is not engaged with the engaging supporting member is indirectly supported by the lens frame via the lens which is engaged with the engaging supporting member.

With the above described arrangement the lens frame directly supports one of the lenses that forms the cemented lens, while the other lens is indirectly supported by the lens frame via the lens that is directly supported by the lens frame. With this arrangement, the size of the lens supporting device is reduced compared to the conventional supporting structure in which the whole of the cemented lens is supported by the lens frame.

In yet another aspect of the present invention, a lens supporting device is provided in which a cemented lens, consisting of a plurality of lenses cemented together, is supported by a lens frame. The lens supporting device has an engaging groove formed along a peripheral rim of the cemented lens. A plurality of engaging pawls are formed on an end part of the lens frame. The plurality of engaging pawls engage with the engaging groove, and support any one of the plurality of lenses which form the cemented lens.

Preferably, the engaging groove is formed along an outer peripheral rim of a cemented surface of the cemented lens.

At least one lens of the plurality of lenses forming the cemented lens is preferably not engaged with the engaging pawls, and projects outwardly from the lens frame.

The engaging groove can also be an annular groove formed throughout a circumferential direction of the cemented lens, and can also be partially formed on the peripheral rim of the cemented lens.

Preferably, a plurality of engaging grooves are formed at predetermined intervals along the peripheral rim of the cemented lens. The plurality of engaging pawls of the lens frame are preferably formed at positions corresponding to the plurality of engaging grooves.

The present disclosure relates to subject matter contained in Japanese Patent Application No. 07-204875 (filed on Aug. 10, 1995) which is expressly incorporated herein by reference in its entirety.

BRIEF DESCRIPTION OF THE DRAWINGS

The above and other objects, features, and advantages of the present invention will be described in greater detail with reference to the accompanying drawings, in which like reference numerals represent similar elements, and wherein.

DESCRIPTION OF THE PREFERRED EMBODIMENT

The present invention will now be described below in greater detail, with specific reference to the accompanying drawings.

Figure 5:
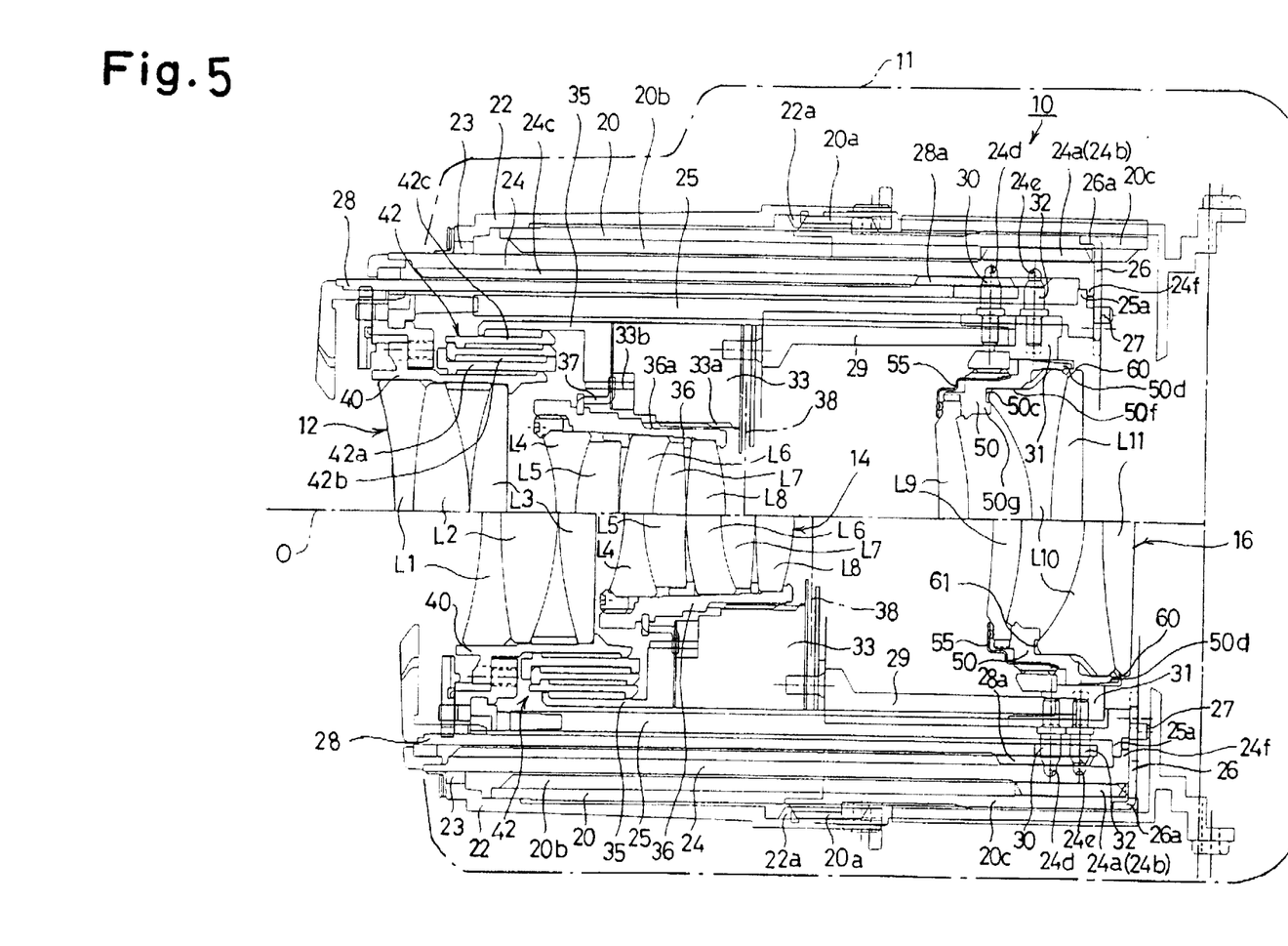
FIG. 5 is a longitudinal sectional view of the zoom lens barrel to which a lens supporting device is applied according to the present invention.

FIG. 5 shows a zoom lens barrel 10 to which a lens supporting device according to the present invention is applied. The lower half of FIG. 5 (the half below the optical axis O) shows the zoom lens barrel 10 in a housed state, while the upper half of FIG. 5 (the half above the optical axis O) shows a state when the zoom lens barrel 10 is at a wide-angle end position.

The zoom lens barrel 10 is provided with three lens groups, i.e., a first lens group 12, a second lens group 14 and a third lens group 16, positioned in this order from an object side. The third lens group 16 is positioned closest to an image surface. The first lens group 12 consists of first, second and third lens elements L1, L2 and L3. The second lens group 14 consists of fourth, fifth, sixth, seventh and eighth lens elements L4, L5, L6, L7, and L8. The third lens group 16 consists of ninth, tenth and eleventh lens elements L9, L10, and L11. A zooming operation is effected by moving the three lens groups 12, 14 and 16 along the optical axis O in accordance with a predetermined relationship.

A barrel block (not shown) is secured to a camera body 11 of the camera. A stationary ring 20 is fitted in the barrel block so as not to rotate. The stationary ring 20 is provided on an outer peripheral surface thereof with an external thread (male helicoid) 20a which is in mesh with an internal thread (female helicoid) 22a formed on an inner peripheral surface of an adjusting ring 22. The adjusting ring 22 is provided, on a front end of an inner peripheral surface thereof, with a light intercepting member 23. The light intercepting member 23 comes into sliding contact with an outer peripheral surface of a cam ring 24.

The stationary ring 20 is provided on its inner peripheral surface with an internal thread (female helicoid) 20b which is engaged by the cam ring 24. The cam ring 24 is provided on its outer peripheral surface with an external thread (male helicoid) 24a and a spur gear 24b. The male helicoid 24a meshes with the female helicoid 20b. The spur gear 24b is inclined in the direction of the lead of the male helicoid 24a. The spur gear 24b is engaged by a drive pinion (not shown) which rotates at a predetermined position. The cam ring 24 is provided on an inner peripheral surface thereof with an internal thread (female helicoid) 24c and inner cam grooves 24d and 24e. The internal thread 24c is adapted to move the first lens group 12. The inner cam grooves 24d, 24e are adapted to move the second and third lens groups 14 and 16. The inner cam grooves 24d, 24e are each provided with a plurality of circumferentially spaced grooves that are formed by partly cutting away the female helicoid 24c.

A linear movement guide ring 25 is fitted on the inner peripheral surface of the cam ring 24. The linear movement guide ring 25 is provided on its rear end with an outer peripheral flange 25a. The outer peripheral flange 25a abuts against an inner peripheral flange 24f of the cam ring 24. A linear movement guide plate 26 is secured to the rear end of the linear movement guide ring 25 by securing pins 27, so that the inner peripheral flange 24f is held between the outer peripheral flange 25a and the linear movement guide plate 26.

The linear movement guide plate 26 is provided with radial projections 26a that are fitted in linear movement guide grooves 20c of the stationary ring 20. Consequently, the linear movement guide ring 25 is free to rotate relative to the cam ring 24 and is movable in the optical axis direction O together with the cam ring 24.

The female helicoid 24c of the cam ring 24 is engaged with an external thread (male helicoid) 28a formed on the outer peripheral surface of a first lens frame 28. The first lens group 12 is secured to the first lens frame 28. The lead of the female helicoid 24c and the lead of the male helicoid 28a are opposite to the lead of the female helicoid 20b and the lead of the male helicoid 24a.

The second lens group 14 is secured to a movable frame 29. Cam pins 30 are provided on an outer peripheral surface of the movable frame 29. The cam pins 30 are fitted in the inner cam grooves 24d of the cam ring 24.

The third lens group 16 is secured to a third lens frame 50. A lens frame supporting ring (lens frame holder) 31 holds the third lens frame 50. Cam pins 32 are provided on an outer peripheral surface of the lens frame supporting ring (lens frame holder) 31. The cam pins 32 are fitted in the inner cam grooves 24e of the cam ring 24. The linear movement guide ring 25 is provided with two linear movement guide grooves (not shown) which extend in a direction parallel with the optical axis O so that the cam pins 30 and 32 are slidably fitted in the corresponding linear movement guide grooves. Thus, the second and third lens groups 14 and 16 are linearly moved by the linear movement guide ring 25.

Figure 1:
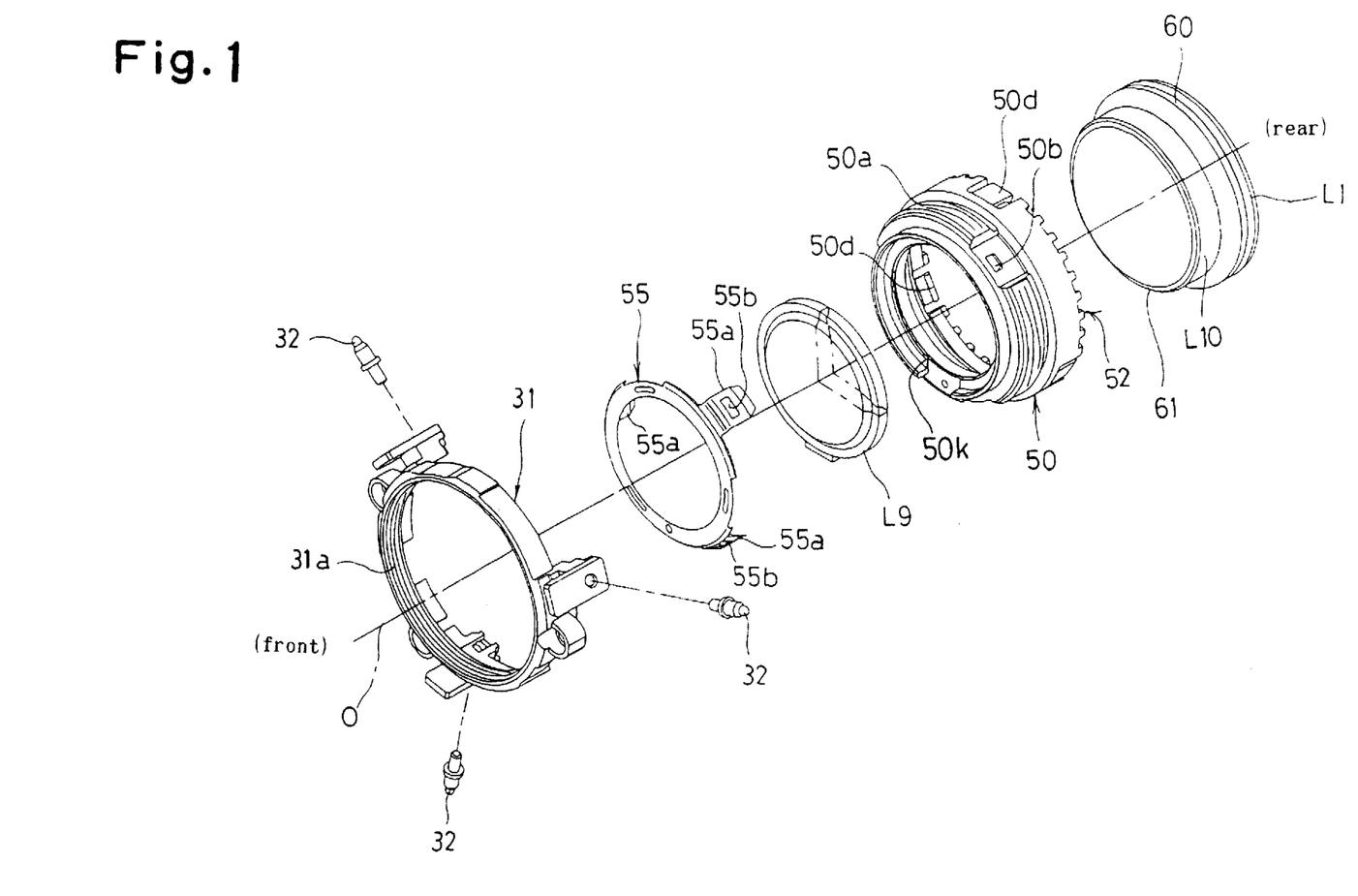
FIG. 1 is an exploded perspective view of a zoom lens barrel to which a lens supporting device according to the present invention is applied.

As can be seen in FIG. 1, the lens frame supporting ring 31 is provided on the inner peripheral surface thereof with an internal thread 31a. The internal thread 31a meshes with an external thread 50a formed on the outer peripheral surface of the third lens frame 50. Consequently, when the third lens frame 50 is rotated about the optical axis O relative to the lens frame supporting ring 31, the axial position of the third lens frame 50 relative to the lens frame supporting ring 31 changes.

The ninth lens L9 is secured to the front end of the third lens frame 50 through an elastically deformable annular keep plate 55. The keep plate 55 is made of a thin metal plate. The third lens frame 50 is provided on the outer peripheral surface thereof with three radially extending engagement pawls 50b. The engagement pawls 50b are spaced at an equi-angular distance in the circumferential direction of the third lens frame 50. The keep plate 55 is formed with three legs 55a that extend rearward from the peripheral edge of the keep plate 55. The legs 55a are spaced at an equi-angular distance in the circumferential direction of the keep plate 55. Each leg 55a is provided with an engaging hole 55b in which the engaging pawls 50b are correspondingly engaged. Namely, the ninth lens group L9 is secured to the front end of the third lens frame 50 by the keep plate 55 (described in greater detail below) while the engaging pawls 50b are engaged in the corresponding engaging holes 55b. The ninth lens group L9 is inserted from the front of the third lens frame 50 to be engaged with the same. Further, the peripheral rim and the outer periphery of the rear surface of the ninth lens group L9, are respectively in contact with the inner periphery of the third lens frame 50 and a position index flange 50k. The position index flange 50k projects from the inner periphery of the third lens frame 50, as can be seen in FIG. 1. When assembled, each of the engaging holes 55b of the keep plate 55 is engaged with the corresponding engaging pawl 50b, and the ninth lens group L9 is secured by the keep plate 55.

The tenth lens group L10 and the eleventh lens group L11 are secured to the inner rear end of the third lens frame 50. The tenth lens group L10 and the eleventh lens group L11 are cemented together by an unillustrated transparent adhesive, to form, as a whole, a cemented lens HL. A generally V-shaped annular groove 60 is provided on an outer peripheral rim (surface) of the cemented lens HL. The annular groove 60 is formed along the peripheral rim (surface) of the cemented surface of the tenth lens group L10 and the eleventh lens group L11.

Figure 2:
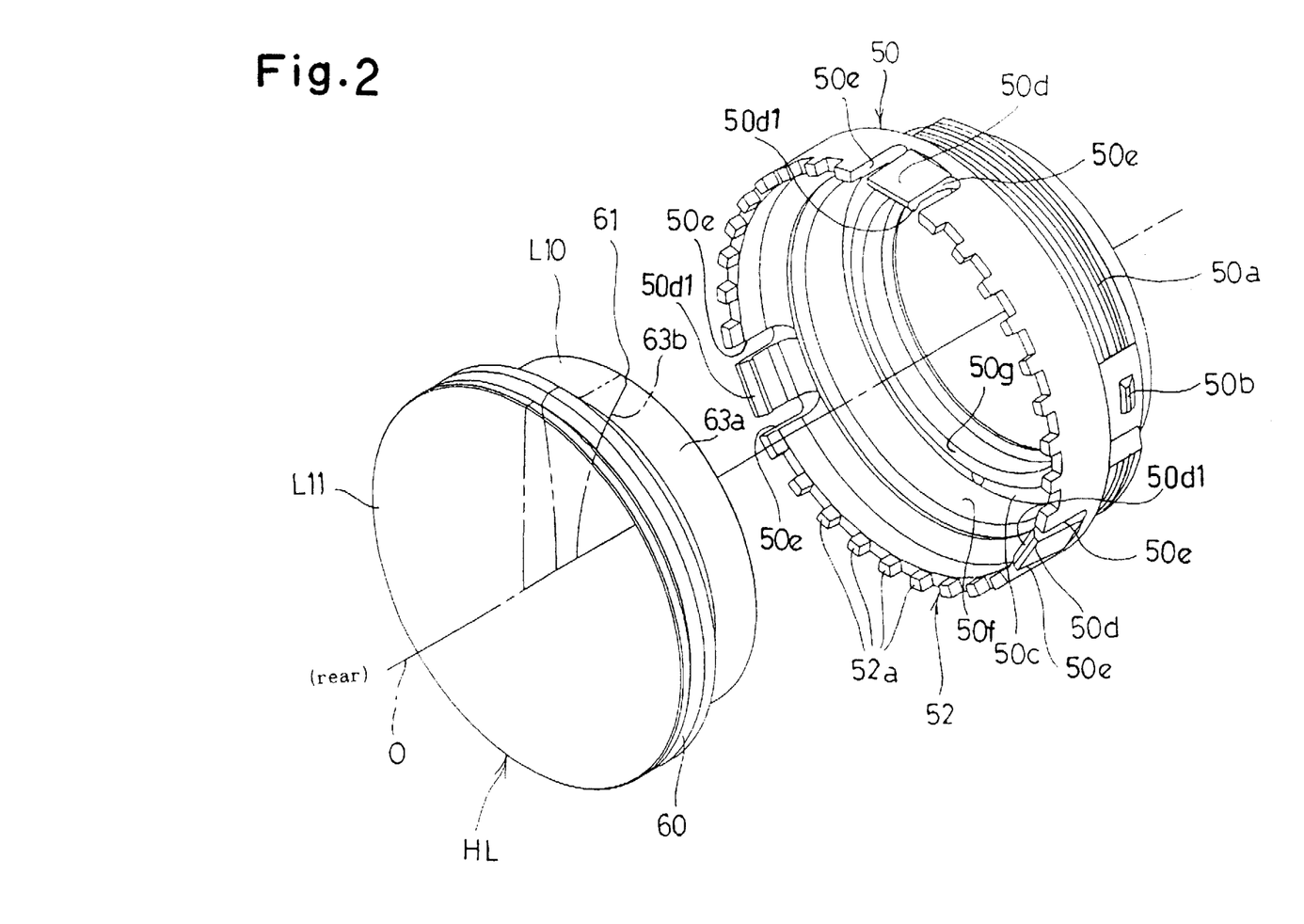
FIG. 2 is an exploded rear perspective view of a cemented lens and a lens frame to support the cemented lens shown in FIG. 1.
Figure 4:
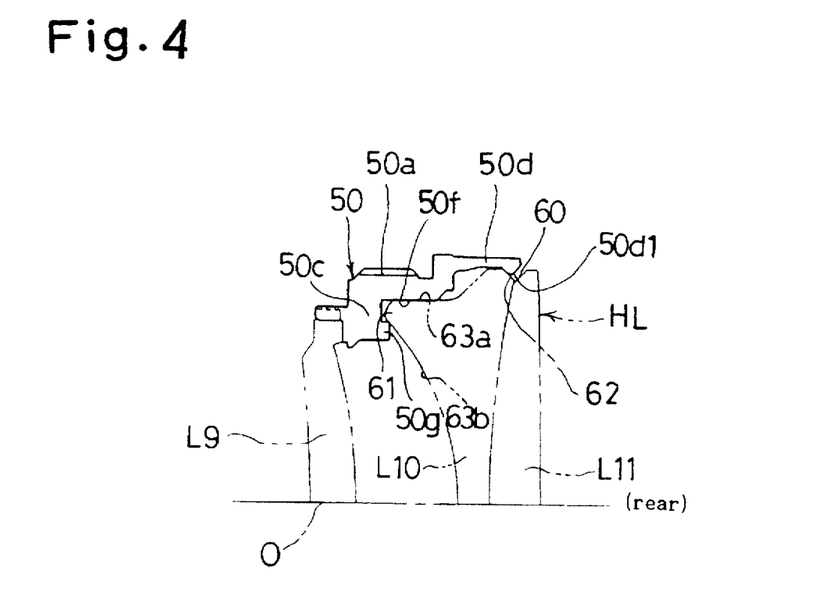
FIG. 4 is a longitudinal sectional view of an upper half of the assembly shown in FIG. 3.

As best illustrated in FIG. 2, the third lens frame 50 is provided on the inner peripheral surface thereof with a supporting portion 50c. The supporting portion 50c supports a front end 61 of the peripheral edge of the tenth lens group L10. Namely, as illustrated in FIG. 4, the supporting portion 50c consists of a circular supporting surface 50f and a circular supporting projection 50g. The circular supporting projection 50g extends towards the rear of the optical axis O (i.e., towards the right direction as viewed in FIG. 5). The circular supporting projection 50g is positioned closer to the optical axis O than the circular supporting surface 50f.

The tenth lens group L10 is held by the third lens frame 50 such that an outer peripheral surface 63a of the front portion of the tenth lens group L10 is brought into surface contact with the circular supporting surface 50f. The peripheral edge of a front end surface 63b of the tenth lens group L10 is brought into contact with the supporting projection 50g.

The third lens frame 50 is provided on its rear end with three engaging pawls 50d. The engaging pawls 50d are spaced at an equi-angular distance in the circumferential direction of the third lens frame 50 and engage with the annular groove 60. A projection (edge) 50d, is formed on the inner surface of each end of the engaging pawls 50d. The cemented lens HL is secured to the inner rear end portion of the third lens frame 50 when the outer peripheral surface 63a is brought into surface contact with the supporting surface 50f, and when the peripheral edge of the front end surface 63b abuts against the supporting projection 50g, and when the engaging pawls 50d are engaged in the annular groove 60. The cemented lens HL is inserted from the rear (i.e., from the right side shown in FIG. 4) of the third lens frame 50 along the direction of the optical axis O, and is secured to the third lens frame 50.

An annular slant end surface 62 is formed on the annular groove 60 of the cemented lens HL. The annular slant end surface 62 comes into contact with the edges 50d₁ of each of the engaging pawls 50d. In such a state, the cemented lens HL, is compelled in the optical axis direction towards the supporting portion 50c, while being supported by the third lens frame 50. According to such an arrangement, the tenth lens group L10 is directly supported by the third lens frame 50, and the eleventh lens group L11 is indirectly supported by the third lens frame 50 via the tenth lens group L10. Therefore, as seen in FIG. 4, the tenth lens group L10 projects inwardly towards the third lens frame 50, while the eleventh lens group L11 projects outwardly away from the third lens frame 50. The supporting portion 50c and the engaging pawls 50d of the third lens frame 50 constitute an engagement supporting member.

According to the supporting structure of the present embodiment of the present invention, the cemented lens HL is simply supported by the third lens frame 50 by merely inserting the cemented lens HL in the third lens frame 50. Further according to the present invention, it is not necessary for each engaging pawl 50d to be elongated to reach the peripheral rim the rear end of the cemented lens HL. Accordingly, the cemented lens HL is supported without an elongation of the engaging pawls 50d, and therefore it is possible to minimize the size of the third lens frame 50.

As described above, according to the supporting structure of the present embodiment of the present invention, the third lens frame 50 directly supports one of the lens groups that forms the cemented lens HL, namely the tenth lens group L10, while the other lens group, namely the eleventh lens group L11, is indirectly supported by the third lens frame 50 via the tenth lens group L10. with this arrangement, the size of the supporting structure is reduced compared to the conventional supporting structure in which the whole of the cemented lens HL is supported by the lens frame.

In the prior art, in which the whole of the cemented lens HL is supported by the lens frame, there has been a problem that if a centering of the tenth lens group L10 and the eleventh lens group L11 is not sufficiently made, the lens groups L10 and L11 are not adequately engaged with the lens frame. According to the supporting structure of the present embodiment of the present invention, it is possible to cement the tenth lens group L10 to the eleventh lens group L11 without considering sufficient centering thereof, and the cemented lens HL can be adequately supported by the third lens frame 50.

In the supporting structure of the present embodiment, the eleventh lens group L11 is only supported by the tenth lens group L10 due to the adhesive used for cementing the two lens groups together. This arrangement has only recently become possible due to improvements in the strength of adhesives. It should be understood that the eleventh lens group L11 is only supported by the tenth lens group L10 due to the strength of the adhesive, and that no other mechanical supporting device is necessary.

Figure 3:
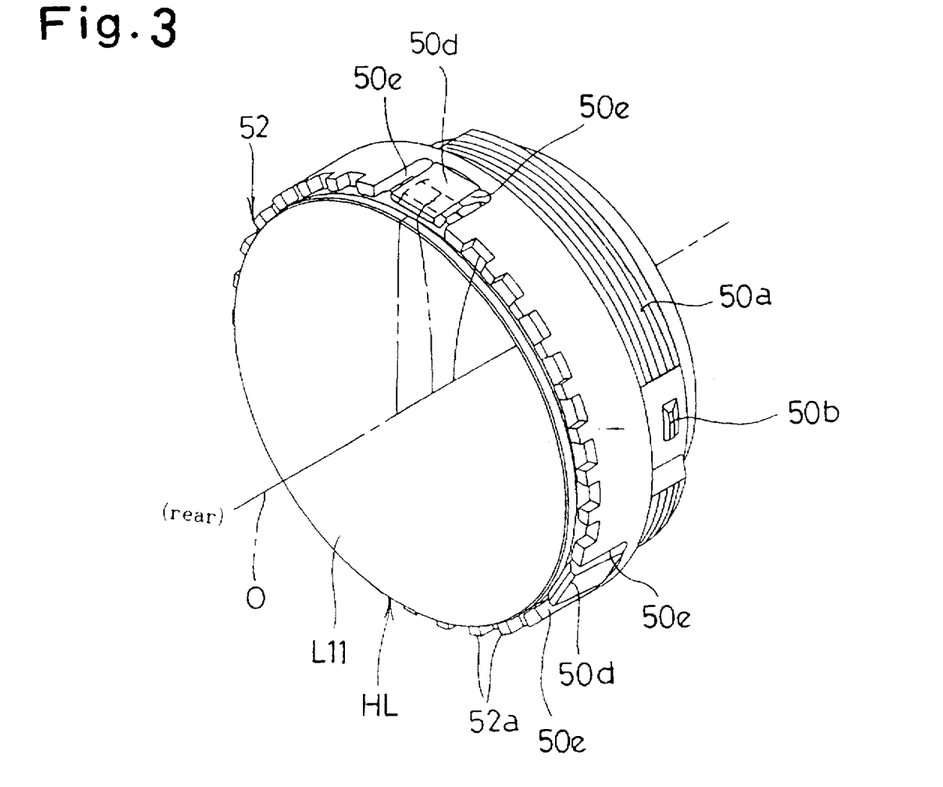
FIG. 3 is a perspective view of an assembly of the cemented lens and the lens frame shown in FIG. 2.

Grooves 50e are formed on both sides of each engaging pawl 50d of the third lens frame 50. The grooves 50e are elongated in a direction parallel to the optical axis O, as can be seen in FIG. 3. It is preferable to pour adhesive into each of the grooves 50e after the cemented lens HL has been inserted into the rear of the third lens frame 50, so that the cemented lens HL and the third lens frame 50 may be firmly fixed to each other.

The rear end surface of the third lens frame 50 is provided with an engagement tooth array 52. The engagement tooth array 52 consists of a plurality of engaging teeth 52a, that extend in a direction substantially parallel with the optical axis O. The engaging teeth 52a are spaced at a substantially equi-pitch in the circumferential direction of the third lens frame 50, except for the portion of the peripheral surface of the third lens frame 50 that is provided with the engaging pawls 50d and the grooves 50e. Namely, the engaging teeth 52a are provided at a substantially equi-pitch on the portion of the end periphery of the third lens frame 50 other than the portion thereof on which the engaging pawls 50d and the grooves 50e are formed.

The engagement tooth array 52 is designed to be capable of being engaged by an adjuster (not shown), which is inserted from outside of the camera. The adjuster is provided with a plurality of engaging projections which are formed in an opposite arrangement to the arrangement of the engaging teeth 52a. Therefore, the engaging teeth of the adjuster are capable of being engaged with the engagement tooth array 52. The adjuster is used during a zoom adjustment after the lens is focused on an object to be photographed, during assembling or an adjustment of the lens. The positions of the predetermined lenses of the zoom optical system in the optical axis direction, are adjusted so that the position of the image point is not varied during a zooming operation. In the present embodiment, the zooming adjustment is performed by the above described adjuster, through the process of adjusting the position of the third lens group 16 in the optical axis direction by rotating the third lens frame 50 relative to the lens frame supporting ring 31.

Referring again to FIG. 5, an AF/AE unit 33, per se known, is secured to the front end of the movable frame 29 for moving the second lens group 14. A movable light intercepting ring 35 is secured to the front end of the AF/AE unit 33. The AF/AE unit 33 is provided on an inner peripheral surface thereof with an internal thread (female helicoid) 33a which is in mesh with an external thread (male helicoid) 36a provided on the outer peripheral surface of a second lens frame 36. The second lens frame 36 supports the second lens group 14.

The AF/AE unit 33 is provided with a drive pin 33b which is driven in the circumferential direction by an angular displacement determined in accordance with object distance data. The drive pin 33b is engaged by an association arm 37 which projects outward in the radial direction of the second lens frame 36. Consequently, the second lens frame 36, and accordingly, the second lens group 14 are moved in the optical axis direction O in accordance with the angular displacement of the drive pin 33b and the leads of the helicoids 33a and 36a to carry out a focusing operation. Also, the AF/AE unit 33 opens and closes shutter blades 38 in accordance with object brightness data (luminance data).

The first lens frame 28 is provided on the inner peripheral surface thereof with a linear movement guide key (not shown). The linear movement guide key is slidably fitted in a linear movement guide groove (not shown) formed on the outer peripheral surface of the linear movement guide ring 25. Thus, the first lens frame 28 and the first lens group 12 are linearly moved by the linear movement guide ring 25 in accordance with the engagement between the linear movement guide key and the linear movement guide groove.

A supporting cylinder 40 is secured in the first lens frame 28 to directly support the first lens group 12. A light intercepting portion 42 is provided between the supporting cylinder 40 and the movable light intercepting ring 35. The light intercepting portion 42 intercepts light which would otherwise enter a space between the supporting cylinder 40 and the light intercepting ring 35. The light intercepting portion 42 consists of first, second and third light intercepting rings 42a, 42b and 42c, which are concentrically arranged and are supported by the first lens frame 28 and the movable light intercepting ring 35 to relatively move in the optical axis direction O.

An operation of the zoom lens barrel of the present invention, having the overall construction as described above, will now be described.

If the drive pinion (not shown), which meshes with the spur gear 24b of the cam ring 24, is rotated by a motor (not shown) towards the wide angle position (upper half of FIG. 5), the cam ring 24 is moved in the optical axis direction while rotating, in accordance with the engagement between the male helicoid 24a and the female helicoid 20b. Consequently, the first lens frame 28, which is guided by the linear movement guide ring 25 to linearly move, is further advanced in the optical axis direction O with respect to the cam ring 24 in accordance with the opposite leads of the male helicoid 28a and the female helicoid 24c. Similarly, the movable frame 29 and the lens frame supporting ring 31, that are held by the linear movement guide ring 25 to linearly move, are advanced in the optical axis direction O by the rotation of the cam ring 24 in accordance with the profiles of the cam grooves 24d and 24e to perform the zooming operation, since the cam pins 30 and 32 of the movable frame 29 and the lens frame supporting ring 31 are engaged in the cam grooves 24d and 24e of the cam ring 24, respectively.

In the above embodiment, the cemented lens HL is designed to be supported by the third lens frame 50 via the three engaging pawls 50d. However, it is possible to provide more, or less, than three engaging pawls formed at substantially regular intervals in the circumferential direction of the lens frame.

In addition, it is not necessary to form the engaging groove 60 of the cemented lens HL throughout the whole of the circumferential direction of the cemented lens HL. The engaging groove may be formed partially, or only at portions corresponding to the engaging pawls 50d. It is also possible to provide a plural number of projections instead of the engaging groove.

Further although in the present embodiment the annular groove 60 serves as the engaging groove for the cemented lens HL, the present invention is not limited to such a structure. A plurality of engaging grooves may be formed at those portions at which each of the engaging pawls 50d is provided on the peripheral rim of the cemented surface of the tenth lens group L10 and the eleventh lens group L11, or on the peripheral rim of the tenth lens group L10.

Although the description of the present embodiment has been made with reference to the cemented lens HL consisting of two lens groups, the present invention can equally be applied to a cemented lens consisting of more than two lens groups.

As above described, in the lens supporting structure of the present invention, the engaging groove is formed on the peripheral rim of the lens, and the engaging pawls are provided on the lens frame to be engaged with the engaging groove. With such a structure, the process of mounting the lens to the lens frame can be completed simply by inserting the lens in the lens frame. In addition, since the engaging pawls are engaged with the engaging groove formed on the peripheral rim of the lens, the size of the lens frame can be minimized, and it is possible to provide a lens supporting structure capable of saving further space.

What is claimed is:

1. A lens supporting device having a lens which is supported by a lens frame, comprising:

an engaging groove formed on a peripheral rim of said lens; and a plurality of engaging pawls formed on said lens frame, said engaging pawls engaging with said engaging groove to secure said lens to said lens frame.

2. The lens supporting device according to claim 1, wherein said lens is a cemented lens consisting of a plurality of lenses cemented together, and wherein said engaging groove is an annular groove formed along an outer peripheral rim of a cemented surface of said plurality of lenses.

3. The lens supporting device according to claim 2, a cross-section of said engaging groove being approximately V-shaped.

4. The lens supporting device according to claim 2, wherein said plurality of engaging pawls are formed along a circumferential direction of said lens frame.

5. A lens supporting device, comprising:

an engagement supporting member formed on a lens frame; and at least a first lens and a second lens cemented together to form a cemented lens, wherein said cemented lens supported by said lens frame, and wherein one of said first lens and said second lens is engaged by said engagement supporting member, said one of said first lens and said second lens engaged by said engagement supporting member being supported by said engagement supporting member, and further wherein another of said first lens and said second lens not engaged with said engagement supporting member is indirectly supported by said lens frame via said one of said first lens and said second lens engaged by said engaging supporting member.

6. A lens supporting device having a cemented lens including a plurality of lenses cemented together and supported by a lens frame, comprising:

an engaging groove formed along a peripheral rim of said cemented lens; and a plurality of engaging pawls formed on an end part of said lens frame, wherein said plurality of engaging pawls is engaged by said engaging groove, and further wherein said plurality of engaging pawls support any one of said plurality of lenses which form said cemented lens.

7. The lens supporting device according to claim 6, wherein said engaging groove is formed along an outer peripheral rim of a cemented surface of said cemented lens.

8. The lens supporting device according to claim 7, wherein at least one lens of said plurality of lenses forming said cemented lens is not engaged by said engaging pawls, said at least one lens projecting outwardly from said lens frame.

9. The lens supporting device according to claim 7, wherein said engaging groove is an annular groove formed along an entire circumference of said cemented lens.

10. The lens supporting device according to claim 7, wherein said engaging groove is at predetermined portions formed of said peripheral rim of said cemented lens.

11. The lens supporting device according to claim 7, wherein a plurality of engaging grooves are formed at predetermined intervals along said peripheral rim of said cemented lens.

12. The lens supporting device according to claim 11, wherein said plurality of engaging pawls of said lens frame are formed at positions corresponding to said plurality of engaging grooves.

* * * * *

UNITED STATES PATENT AND TRADEMARK OFFICE
CERTIFICATE OF CORRECTION

PATENT NO. : 5,754,350
DATED : May 19, 1998
INVENTOR(S) : N. SATO

It is certified that error appears in the above-identified patent and that said Letters Patent is hereby corrected as shown below:

On the cover page of the printed patent, paragraph [56] References Cited, U.S. PATENT DOCUMENTS, please insert the following:

—5,130,851  7/1992  SHIRIE  359/700—.

On the cover page of the printed patent, paragraph [56] FOREIGN PATENT DOCUMENTS, column 2, line 5, please insert the following:

—  1,147,811  4/1969  Great Britain
    1,017,775  1/1966  Great Britain
    830,271    3/1960  Great Britain
    561,503    5/1944  Great Britain—.

Signed and Sealed this

Twenty-first Day of December, 1999

Attest:

Attesting Officer

Q. TODD DICKINSON

Acting Commissioner of Patents and Trademarks